(12) United States Patent
Lee et al.

(10) Patent No.: US 12,665,973 B2
(45) Date of Patent: Jun. 23, 2026

(54) IMAGE FORMING APPARATUS WITH SLIDING KEYBOARD

(71) Applicant: Hewlett-Packard Development Company, L.P., Spring, TX (US)

(72) Inventors: Dongwoo Lee, Seongnam Si (KR); Hanjun Lee, Seongnam Si (KR); Chanhyun Park, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/868,882

(22) PCT Filed: Dec. 15, 2022

(86) PCT No.: PCT/US2022/052977
§ 371 (c)(1),
(2) Date: Nov. 25, 2024

(87) PCT Pub. No.: WO2023/229642
PCT Pub. Date: Nov. 30, 2023

(65) Prior Publication Data
US 2025/0324006 A1 Oct. 16, 2025

(30) Foreign Application Priority Data

May 26, 2022 (KR) ........................ 10-2022-0064747

(51) Int. Cl.
*H04N 1/00* (2006.01)
*G03G 15/00* (2006.01)
*G03G 21/16* (2006.01)

(52) U.S. Cl.
CPC ..... *H04N 1/00533* (2013.01); *G03G 15/5016* (2013.01); *G03G 15/6552* (2013.01);
(Continued)

(58) Field of Classification Search
CPC .......... G03G 15/5016; G03G 15/6552; G03G 21/1609; G03G 21/1614; H04N 1/00533;
(Continued)

(56) References Cited

U.S. PATENT DOCUMENTS 6,794,669 B2 9/2004 Chelvayohan et al.
7,636,748 B2 * 12/2009 Duarte .................... G06F 1/162
345/170

(Continued)

FOREIGN PATENT DOCUMENTS

JP 04-315105 A 11/1992
JP 08-049042 A 2/1996
(Continued)

OTHER PUBLICATIONS

"Measurement Sensors: Specular vs Diffuse", Panasonic Industry, https://na.industrial.panasonic.com/blog/measurement-sensors-specular-vs-diffuse, Dec. 7, 2011, 6 pages.

*Primary Examiner* — Stephanie E Bloss
*Assistant Examiner* — Laura Roth
(74) *Attorney, Agent, or Firm* — Foley & Lardner LLP

(57) ABSTRACT

An example image forming device includes a printing portion to print an image on a print medium, a protruding portion protruding upward from an upper surface of the printing portion and comprising an accommodation portion, and a keyboard movable between a storage position in which the keyboard is partially stored in the accommodation portion and a withdrawal position in which the keyboard is withdrawn from the accommodation portion. In the storage position, the keyboard is positioned inside an outermost surface of the printing portion.

15 Claims, 10 Drawing Sheets

(52) U.S. Cl.
CPC ..... *G03G 21/1609* (2013.01); *H04N 1/00384*
(2013.01); *H04N 1/00408* (2013.01); *H04N*
*1/00559* (2013.01); *G03G 21/1614* (2013.01);
*H04N 2201/0094* (2013.01)

(58) Field of Classification Search
CPC .......... H04N 1/00384; H04N 1/00408; H04N
1/00559; H04N 2201/0094
See application file for complete search history.

(56) References Cited

U.S. PATENT DOCUMENTS

| | | | |
|---|---|---|---|
| 8,243,342 B2 | 8/2012 | Mandai et al. | |
| 8,648,820 B2 | 2/2014 | Sensu | |
| 2001/0033396 A1* | 10/2001 | Sheng ................ | H04N 1/00127 |
| | | | 358/468 |
| 2007/0147869 A1* | 6/2007 | Akiyama .......... | G03G 15/5016 |
| | | | 399/81 |
| 2008/0199201 A1* | 8/2008 | Kohara ............. | H04N 1/00519 |
| | | | 399/81 |

| | | | |
|---|---|---|---|
| 2009/0279146 A1 | 11/2009 | Mandai et al. | |
| 2009/0323130 A1 | 12/2009 | Mandai et al. | |
| 2011/0128247 A1 | 6/2011 | Sensu | |
| 2012/0243042 A1* | 9/2012 | Uchida ............. | G03G 15/5016 |
| | | | 358/1.15 |

FOREIGN PATENT DOCUMENTS

| | | | | |
|---|---|---|---|---|
| JP | 2001-245087 A | | 9/2001 | |
| JP | 2002171372 A | * | 6/2002 | |
| JP | 2004-279692 A | | 10/2004 | |
| JP | 2005-300871 A | | 10/2005 | |
| JP | 2009-089807 A | | 4/2009 | |
| JP | 2010-160337 A | | 7/2010 | |
| JP | 4633143 B2 | | 2/2011 | |
| JP | 4854703 B2 | | 1/2012 | |
| JP | 5155287 B2 | | 3/2013 | |
| JP | 2014-225033 A | | 12/2014 | |
| JP | 5738666 B2 | | 6/2015 | |
| KR | 20170032875 A | * | 3/2017 | ........ H04N 1/00352 |

* cited by examiner

IMAGE FORMING APPARATUS WITH SLIDING KEYBOARD

BACKGROUND

An image forming apparatus, for example, a printer, a copier, a scanner, a facsimile machine, a multifunctional apparatus, etc. may perform various functions such as printing an image on a print medium by various printing methods. The functions of an image forming apparatus have diversified, and therefore, a keyboard may be provided as an input device. A keyboard may be installed on the main body of an image forming apparatus, and a user may input a command related to various jobs, such as a print job, a copy job, a scan job, a fax job, and an e-mail job, through the keyboard.

BRIEF DESCRIPTION OF THE DRAWINGS

Various examples will be described below by referring to the following figures.

DETAILED DESCRIPTION

Figure 1:
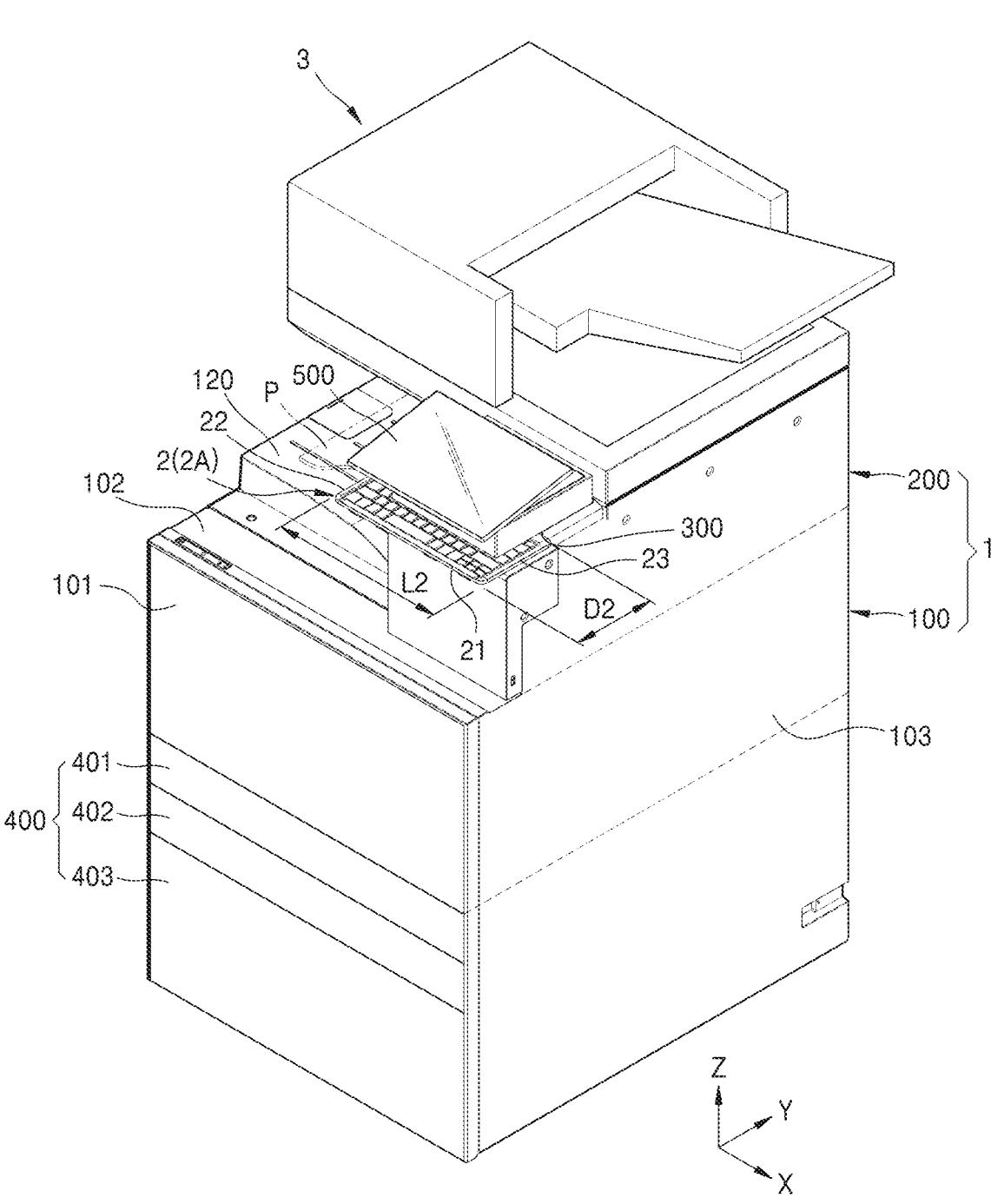
FIG. 1 is a schematic perspective view of an image forming apparatus, and shows a keyboard positioned in a storage position, according to an example.

Hereinafter, various examples will be described with reference to the drawings. Like reference numerals in the specification and the drawings denote like elements, and thus a redundant description may be omitted.

In an image forming apparatus such as a printer, a copier, a scanner, a facsimile machine, a multifunction apparatus, etc., an interface device may be provided to receive a command input for an operation of the image forming apparatus, such as a print command, a copying command, etc., an input for setting various usage environments of the image forming apparatus, etc. The interface device may include various devices suitable for the purpose of the image forming apparatus, such as a button, a touch screen, a keyboard, etc. The interface device may contribute to the convenience and efficiency of the user. The keyboard may be conveniently used to control the performing of a document print job, a scan job, a fax job, etc.

A fixed keyboard protrudes from an outermost part of a main body of the image forming apparatus. The image forming apparatus including the fixed keyboard may use a wider installation space than an image forming apparatus in which a keyboard is not employed. The keyboard may be moved between a storage position, at which the keyboard is stored inside the main body of the image forming apparatus, and a withdrawal position, at which the keyboard is withdrawn from the main body of the image forming apparatus to be used. In a case of a structure in which the keyboard is completely stored inside the main body of the image forming apparatus, because it is difficult for a user to intuitively find a position of the keyboard, and a storage space for completely storing the keyboard needs to be secured inside the main body of the image forming apparatus, the size of the image forming apparatus may increase or a degree of freedom of arrangement of parts inside the image forming apparatus may be reduced.

In an example, an image forming apparatus includes a printing portion to print an image on a print medium, and a protruding portion to protrude upward from an upper surface of the printing portion, the protruding portion having an accommodation portion. A keyboard of the image forming apparatus is movable between a storage position, at which the keyboard is partially stored inside the accommodation portion, and a withdrawal position, at which the keyboard is withdrawn from the accommodation portion. Movement may be implemented, for example, by sliding. Being partially stored indicates that a part of the keyboard protrudes toward the outside of the accommodation portion in the storage position. A protruding part may be, for example, an end in a sliding direction (e.g., a first direction and a depth direction) of the keyboard or an end in a longitudinal direction (e.g., a second direction) of the keyboard. For example, the accommodation portion may have a first length and a first depth. The keyboard may have a second length and a second depth. At least one of the second length and the second depth may be respectively greater than the first length and the first depth. In that case, a part of the keyboard may protrude to the outside of the accommodation portion while the keyboard is positioned in the storage position. Accordingly, the user may intuitively recognize the presence of the keyboard and may easily move the keyboard to the withdrawal position using (e.g., holding) the protruding part of the keyboard. In addition, because the volume of the accommodation portion for storing the keyboard is smaller than the volume of the keyboard, an increase in the size of the image forming apparatus may be minimized and the degree of freedom of arrangement of parts inside the image forming apparatus may be improved. While positioned in the storage position, the keyboard may be positioned inside the outermost surface of the printing portion. In other words, while positioned in the storage position, the keyboard may be positioned in a vertical projection area of the printing portion. In that case, a risk of damage to the keyboard due to a collision with an external object during a process of installing, moving, etc. the image forming apparatus or a process of using the image forming apparatus may be reduced.

In an example, the image forming apparatus may include a display and an option mounting portion. The display may provide visual information about an operation state of the image forming apparatus, a state of a job command input through the keyboard, etc. An option device may be selectively mounted to the option mounting portion. The option device may include a hardware device to provide an additional function to the image forming apparatus. The option device may include, for example, a Wi-Fi module, a card reader, etc. For ease of use, the display may be positioned above the keyboard. The option mounting portion may be positioned below the keyboard. In a case where the keyboard is placed in the storage position, it may be easy to access the option mounting portion.

A discharge tray, on which print media that have undergone printing are to be loaded, may be provided on an upper surface of the printing portion. The protruding portion may be positioned on one side of the discharge tray, for example, one side in the longitudinal direction. A discharge port, through which the print media that have undergone printing are to be discharged, may be provided in the protruding portion. An inner end of the keyboard in the longitudinal direction in the storage position may be positioned on an upper portion of the discharge tray. A discharge port may be positioned below the keyboard.

The protruding portion may include a first part and a second part positioned on an upper portion of the first part and forming the accommodation portion between the first part and the second part. The first part may have a third length greater than the first length, and the second part may have the second length. An outer end of the keyboard in the longitudinal direction may be positioned between a first outer surface of the first part and a second outer surface of the second part. The discharge port may be provided in a first inner surface opposite to the discharge tray of the first part.

A variety of sliding structures may be employed to slide the keyboard between the storage position and the withdrawal position. As an example, a first rail may be provided on the keyboard and a second rail to guide the first rail may be provided in the accommodation portion. An elastic arm to elastically contact the second rail and generate a sliding resistance on the keyboard may be provided on the first rail. A sliding resistance increasing portion to contact the elastic arm so that the sliding resistance is increased in a case where the keyboard approaches the withdrawal position may be provided on the second rail.

An example of the image forming apparatus may include a main body including the accommodation portion. The keyboard is movable between the storage position partially stored in the accommodation portion and the withdrawal position withdrawn from the accommodation portion. In the storage position, a front end of the keyboard in the depth direction and an outer end of the keyboard in the longitudinal direction are positioned inside the front and side surfaces of the main body of the image forming apparatus.

Hereinafter, examples of the image forming apparatus will be described with reference to the accompanying drawings. In addition, in the present specification and drawings, components having substantially the same function are denoted by the same reference numerals, and thus redundant descriptions thereof will be omitted.

Figure 2:
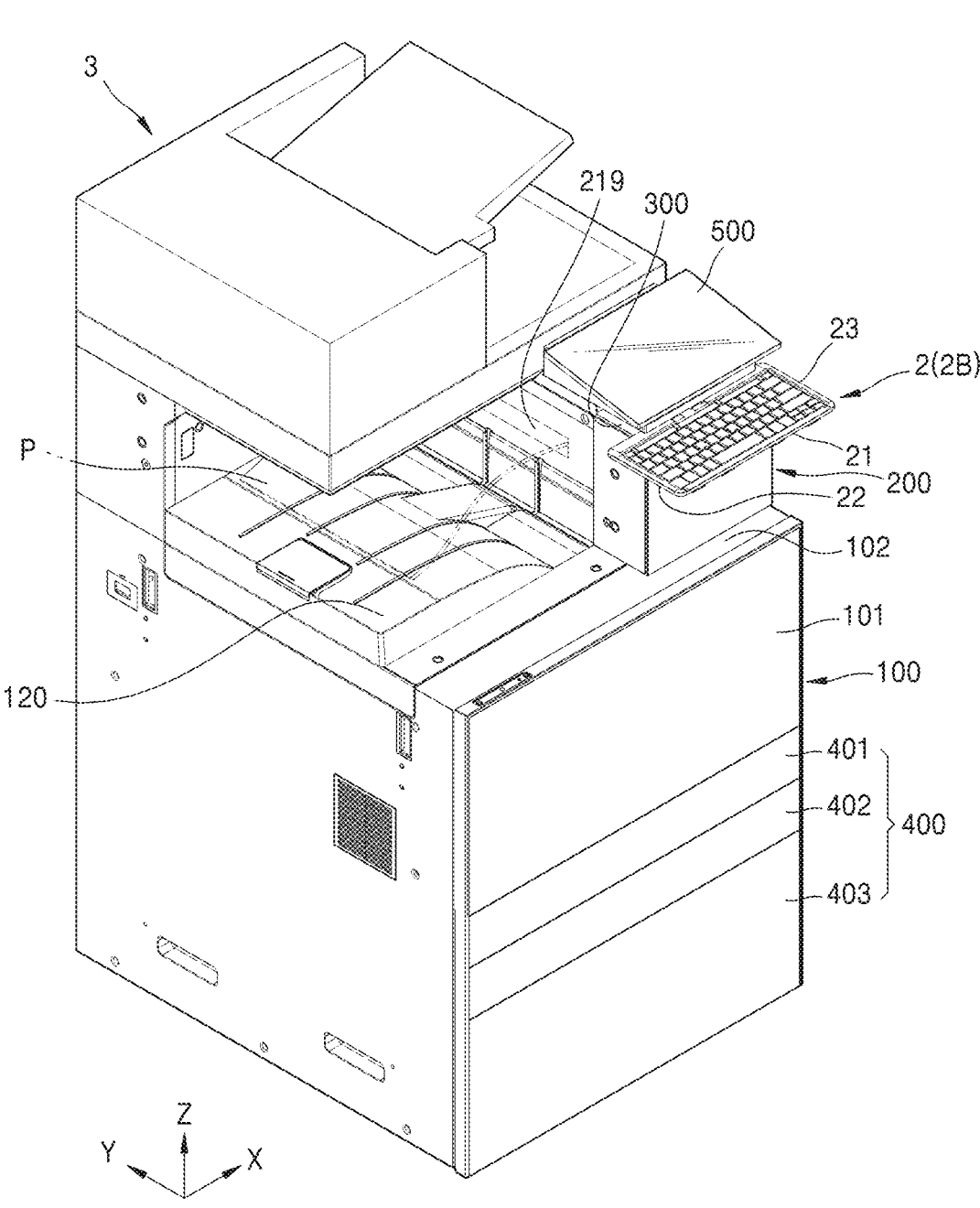
FIG. 2 is a schematic perspective view of an image forming apparatus, and shows a keyboard positioned in a withdrawal position, according to an example.
Figure 3:
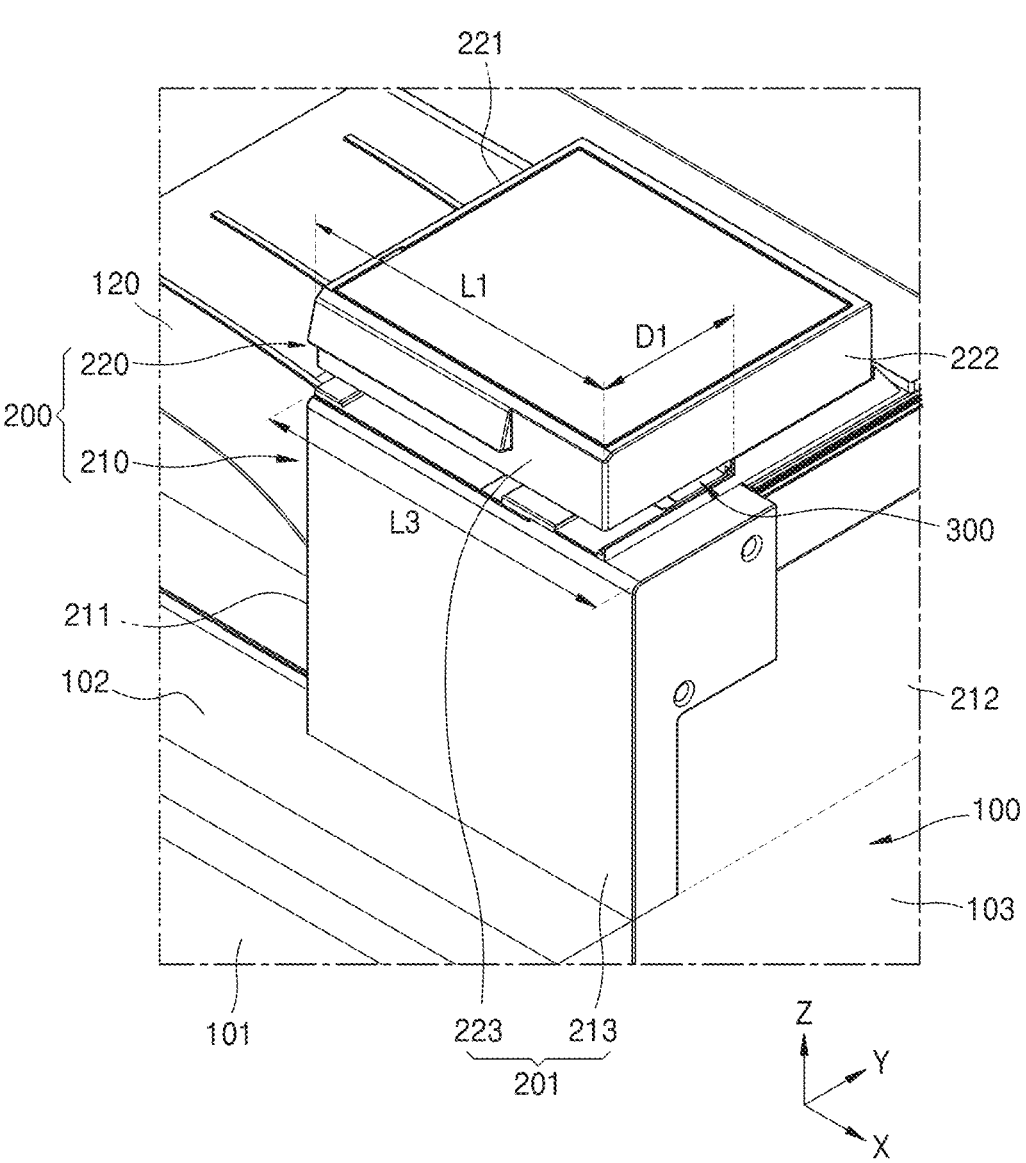
FIG. 3 is a partial perspective view illustrating an accommodation portion according to an example.

FIG. 1 is a schematic perspective view of an image forming apparatus, and shows a keyboard 2 positioned in a storage position 2A, according to an example. FIG. 2 is a schematic perspective view of an image forming apparatus, and shows the keyboard 2 positioned in a withdrawal position 2B, according to an example. FIG. 3 is a partial perspective view illustrating an accommodation portion 300, according to an example.

Referring to FIGS. 1 to 3, the image forming apparatus may include a main body 1 and a keyboard 2. The accommodation portion 300 may be provided in the main body 1. The keyboard 2 may be moved between the storage position (FIG. 1: 2A), at which the keyboard is partially stored in the accommodation portion 300, and the withdrawal position (FIG. 2: 2B), at which the keyboard is withdrawn from the accommodation portion 300. In the storage position 2A, the keyboard 2 may be positioned inside the outermost surface of the main body 1. For example, the keyboard 2 may be slid in a front-rear direction Y to move between the storage position 2A and the withdrawal position 2B. In the storage position 2A, the keyboard 2 may be positioned inside the outermost surface of the main body 1. In other words, in the storage position 2A, the keyboard 2 may be positioned within a vertical projection area of the body 1. For example, the keyboard 2 may be positioned inside a front surface and a side surface of the main body 1. The front surface and the side surface of the main body 1 may be respectively a front surface 101 and a side surface 103 of a printing portion 100, an example of which will be described below. The image forming apparatus may further include a scanner 3 positioned on an upper portion of the main body 1.

The main body 1 may include a printing portion 100 to print an image on a print medium P, and a protruding portion 200 protruding upward from an upper surface 102 of the printing portion 100. The accommodation portion 300 may be provided in the protruding portion 200. The keyboard 2 is movable between the storage position (FIG. 1: 2A), at which the keyboard is partially stored in the accommodation portion 300, and the withdrawal position (FIG. 2: 2B), at which the keyboard is withdrawn from the accommodation portion 300. In the present example, the keyboard 2 may be slid between the storage position 2A and the withdrawal position 2B. The scanner 3 may be supported by an upper portion of the protruding portion 200.

The main body 1 may include a paper feeding portion 400. The paper feeding portion 400 is to accommodate the print medium P. The paper feeding portion 400 may include a paper feeding cassette, for example, paper feeding cassettes 401, 402, and 403. For example, the paper feeding portion 400 may be disposed below the printing portion 100. The print medium P may be picked up one by one from the paper feeding portion 400 and supplied to the printing portion 100.

The printing portion 100 may print an image on the print medium P by various printing methods. The printing method may include, for example, an electrophotographic method, an inkjet method, a thermal transfer method, etc. In the present example, the printing portion 100 is to print an image on the print medium P by the electrophotographic method. The printing portion 100 may include an exposure device, a photoconductor, a developing device, a transfer unit, a fixing unit, etc. The exposure device is to form an electrostatic latent image on a surface of the photoconductor by irradiating light modulated according to image information to the surface of the photoconductor charged to a uniform surface electric potential. The developing device is to develop the electrostatic latent image to a toner image by supplying a toner to the electrostatic latent image formed on the photoconductor. The transfer unit is to form a toner image on the print medium P by transferring the toner image formed on the photoconductor to the print medium P supplied from the paper feeding portion 400. The toner image transferred to the print medium P is held on the print medium P by an electrostatic force. The fixing unit is to fix the toner image on the print medium P by applying heat and pressure to the toner image transferred to the print medium P. The print medium P that has undergone printing is discharged from the printing portion 100.

The protruding portion 200 protrudes upward from the upper surface 102 of the printing portion 100. The protruding portion 200 may be positioned so that a front surface 201 of the protruding portion 200 is stepped inward from the front surface 101 of the printing portion 100. The accommodation portion 300 may be recessed (i.e., immersed) in a sliding direction, for example, in a Y direction, of the keyboard 2 from the front surface 201 of the protruding portion 200. In that case, in a situation in which the keyboard 2 is positioned in the storage position 2A, an example of a structure in which a front end 21 of the keyboard 2 protrudes from the accommodation portion 300 but does not protrude from the front surface 101 of the printing portion 100 may be implemented.

The accommodation portion 300 may include a cut, a recess, etc. located in the protruding portion 200, for example, in a depth direction (a first direction) Y that is the sliding direction of the keyboard 2 and in a longitudinal direction (a second direction) X perpendicular to the depth direction Y. The depth direction Y may be a front-back direction with respect to a front surface of the main body 1, for example, the front surface 101 of the printing portion 100. The longitudinal direction X may be a transverse direction. The accommodation portion 300 may include the cut, the recess, etc. in the depth direction Y from the front surface 201 of the protruding portion 200, and may have an open front in the depth direction Y and may have both sides open in the longitudinal direction X. A discharge tray 120, on which the print medium P discharged from the printing portion 100 is to be loaded, may be provided on the upper surface 102 of the printing portion 100. The protruding portion 200 may be positioned on one side of the discharge tray 120 in the longitudinal direction X. The keyboard 2 may be stored in the accommodation portion 300 provided in the protruding portion 200, and thus easy access to the discharge tray 120 is possible.

The keyboard 2 may be installed in the accommodation portion 300 to be movable between the storage position 2A and the withdrawal position 2B. For example, the keyboard 2 may be slid in the depth direction Y to move between the storage position 2A and the withdrawal position 2B. The storage position 2A is a position where the keyboard 2 is partially stored in the accommodation portion 300. Being partially stored indicates that a part of the keyboard 2 protrudes toward the outside of the accommodation portion 300 in the storage position 2A. A protruding part may include, for example, the front end 21 in the sliding direction of the keyboard 2, that is, the depth direction Y, or either end 22 or 23 of the keyboard 2 in the longitudinal direction X.

In FIG. 3, the keyboard 2 is omitted for clarity of description. Referring to FIG. 3, the accommodation portion 300 may have a first length L1 and a first depth D1. The keyboard 2 may have the second length (FIG. 1: L2) and the second depth (FIG. 1: D2). As an example, the protruding portion 200 may include a first part 210 and a second part 220. The first part 210 protrudes upward in the Z direction from the upper surface 102 of the printing portion 100. The second part 220 is positioned above the first part 210. The second part 220 is partially spaced from the first part 210 upward in the Z direction to form the accommodation portion 300 between the first part 210 and the second part 220.

The first part 210 may have a first inner surface 211 and a first outer surface 212 in the longitudinal direction X. The second part 220 may have a second inner surface 221 and a second outer surface 222 in the longitudinal direction X. The first outer surface 212 and the second outer surface 222 are surfaces adjacent to the side surface 103 of the printing portion 100, and the first inner surface 211 and the second inner surface 221 are surfaces relatively far from the side surface 103 of the printing portion 100. The first inner surface 211 and the second inner surface 221 are surfaces opposing the discharge tray 120. A discharge port 219, through which the print medium P that has undergone printing by the printing portion 100 is to be discharged, may be provided on the first inner surface 211. In the present example, the longitudinal direction X is a discharge direction of the print medium P. The first outer surface 212 may be the same surface as the side surface 103 of the printing portion 100. The second outer surface 222 is a surface stepped inward from the first outer surface 212. Accordingly, the length of the second part 220 may be the same as the first length L1, and the first part 210 has a third length L3 longer than the length of the accommodation portion 300, that is, the first length L1. The front surface 201 of the protruding portion 200, that is, a front surface 213 of the first part 210 and a front surface 223 of the second part 220, may be positioned to be stepped inward from the front surface 101 of the printing part 100.

Figure 4:
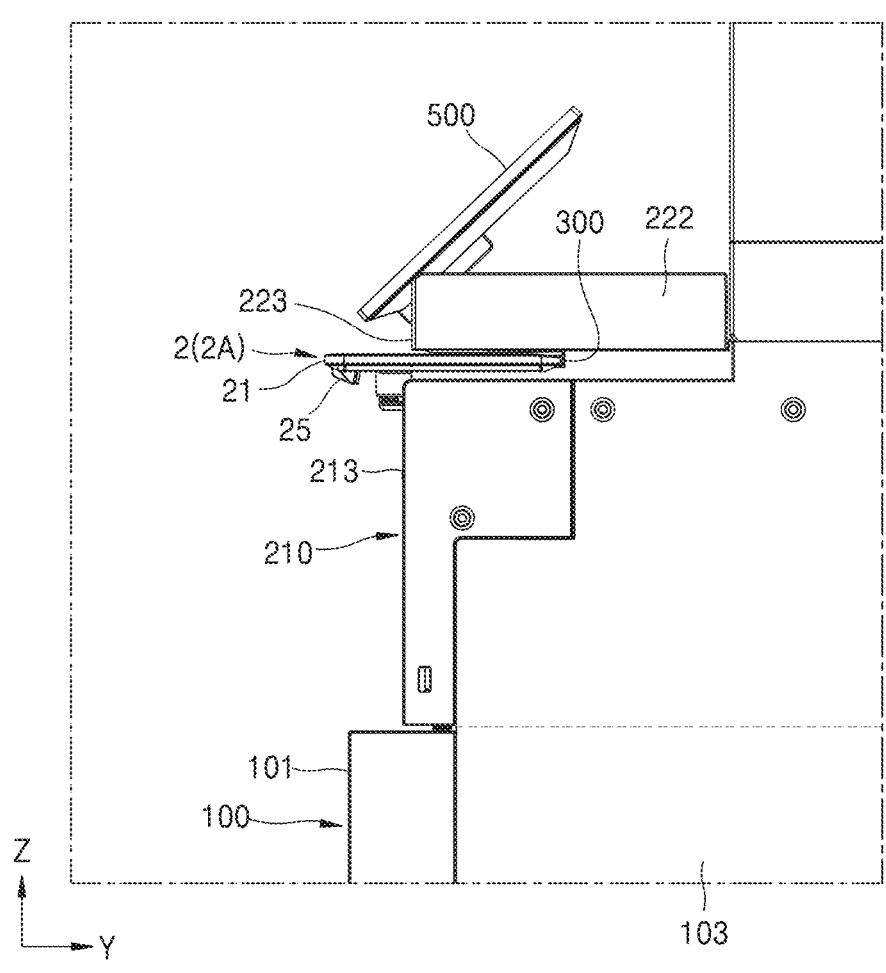
FIG. 4 is a side view showing a keyboard positioned in a storage position according to an example.
Figure 5:
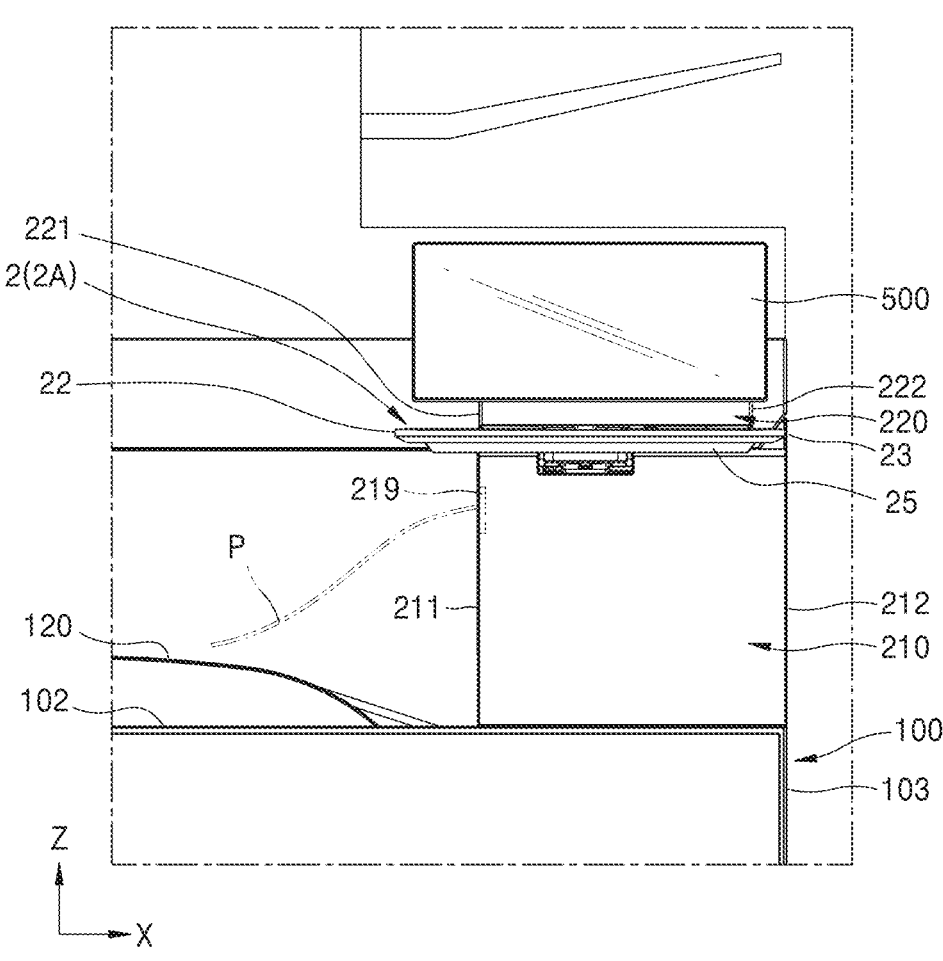
FIG. 5 is a front view showing a keyboard positioned in a storage position according to an example.
Figure 6:
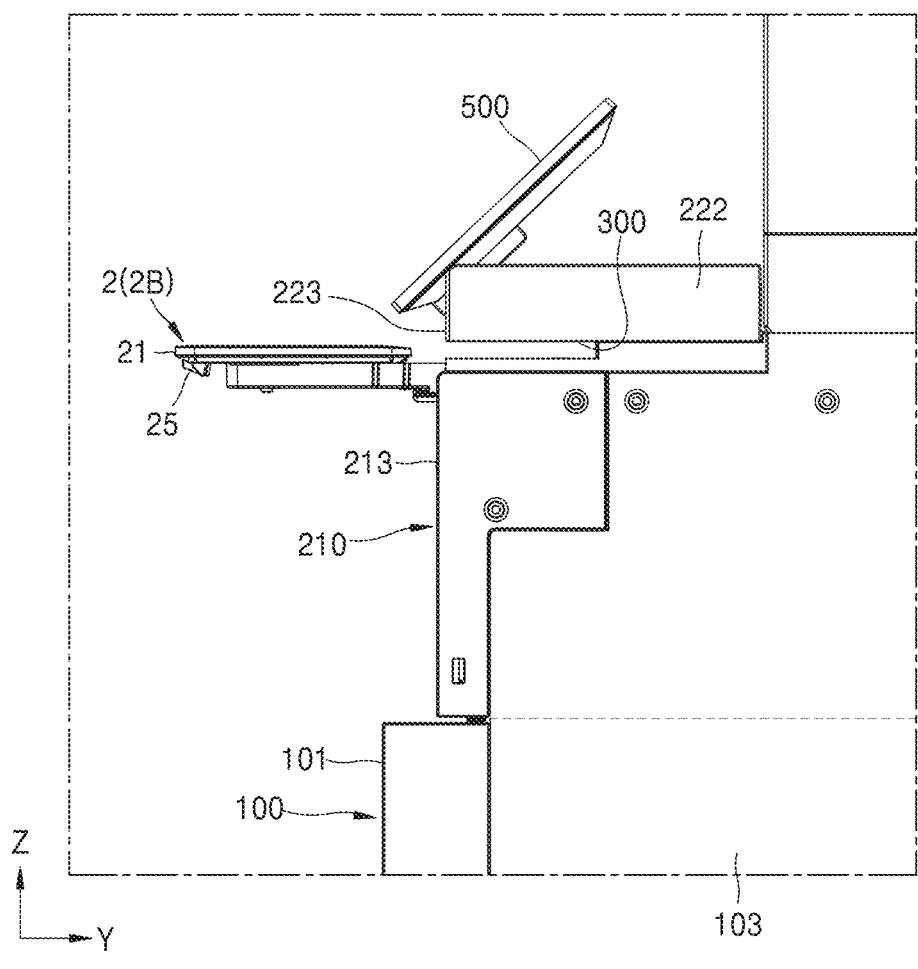
FIG. 6 is a side view showing a keyboard positioned in a withdrawal position according to an example.

FIG. 4 is a side view showing the keyboard 2 positioned in the storage position 2A according to an example. FIG. 5 is a front view showing the keyboard 2 positioned in the storage position 2A according to an example. FIG. 6 is a side view showing the keyboard 2 positioned in the withdrawal position 2B according to an example. Referring to FIGS. 4 and 5, as described above, in the storage position 2A, the keyboard 2 may be positioned further inside than the outermost surface of the main body 1. In other words, in the storage position 2A, the keyboard 2 is positioned in a vertical projection area of the main body 1 of the image forming apparatus. Accordingly, the risk of damage to the keyboard 2 due to a collision with an external object during a process of installing, moving, etc. the image forming apparatus or a process of using the image forming apparatus may be reduced. In the present example, the vertical projection area of the main body 1 of the image forming apparatus is the same as the vertical projection area of the printing portion 100.

In the storage position 2A, the front end 21 of the keyboard 2 in the depth direction Y is positioned further inside than the front surface 101 of the printing portion 100 as shown in FIG. 4, and the outer end 23 of the keyboard 2 in the longitudinal direction X is positioned further inside than the outer surface 103 of the printing portion 100 as shown in FIG. 5. The inner end 22 of the keyboard 2 in the longitudinal direction X may be positioned on an upper portion of the discharge tray 120, and accordingly, even in a case where the keyboard 2 having the longer second length L2 is employed, an arrangement in which the outer end 23 is positioned further inside than the outer surface 103 of the printing portion 100 may be easily implemented.

A handle 25 may be provided on the keyboard 2. The handle 25 may be exposed to the outside of the accommodation portion 300 in a state where the keyboard 2 is positioned in the storage position 2A. For example, the handle 25 may be arranged near the front end 21 of the keyboard 2. The handle 25 may protrude downward from a lower surface of the keyboard 2. A user may easily slide the keyboard 2 positioned in the storage position 2A to the withdrawal position 2B as shown in FIG. 6 by using (e.g., holding and pulling) the handle 25. In the withdrawal position 2B, the keyboard 2 may protrude forward beyond the front surface 101 of the printing portion 100, and the user may input a command for operating the image forming apparatus, information for setting an operation environment, etc. through the keyboard 2.

In order for the front end 21 or both ends 22 and 23 of the keyboard 2 to protrude from the accommodation portion 300 in the storage position 2A, the second length L2 or the second depth D2 may be respectively greater than the first length L1 or the first depth D1. Referring to FIGS. 1 to 6, an example form of the keyboard 2 partially stored in the accommodation portion 300 in the storage position 2A according to the relationship between the second length L2 and the second depth D2 and between the first length L1 and the first depth D1 will be described.

As an example, in a case where the second depth D2 is greater than the first depth D1, the front end 21 of the keyboard 2 in the depth direction Y in the storage position 2A protrudes to the outside of the accommodation portion 300, for example, forward. The user may easily recognize the presence of the keyboard 2 by visually recognizing the protruding front end 21, pull the keyboard 2 by using the protruding front end 21, and move the keyboard 2 to the withdrawal position 2B. The front end 21 of the keyboard 2 positioned in the withdrawal position 2B may be pushed and moved to the storage position 2A.

As an example, in a case where the second length L2 is greater than the first length L1, end 22 or end 23 of the keyboard 2 protrudes from the accommodation portion 300 in the storage position 2A. In the present example, both ends 22 and 23 of the keyboard 2 protrude from the accommodation portion 300. The user may easily recognize the presence of the keyboard 2 by visually recognizing both of the protruding ends 22 and 23, pull the keyboard 2 by holding both of the protruding ends 22 and 23, and move the keyboard 2 to the withdrawal position 2B. Both ends 22 and 23 of the keyboard 2 positioned in the withdrawal position 2B may be pushed and moved to the storage position 2A. In the storage position 2A, the outer end 23 of the keyboard 2 may be positioned between the first outer surface 212 of the first part 210 and the second outer surface 222 of the second part 220.

In the present example, the second length L2 is greater than the first length L1, and the second depth D2 is greater than the first depth D1. In the storage position 2A, the front end 21 and both ends 22 and 23 of the keyboard 2 protrude to the outside of the accommodation portion 300. The user may easily recognize the presence of the keyboard 2 visually and move the keyboard 2 between the storage position 2A and the withdrawal position 2B by using a protruding part of the keyboard 2. In the withdrawal position 2B, the keyboard 2 may partially protrude from the outermost surface of the main body 1 of the image forming apparatus. For example, the front end 21 and both ends 22 and 23 of the keyboard 2 may protrude from the front surface 101 of the printing portion 100. Accordingly, the user may easily access the keyboard 2 from the front of the main body 1 of the image forming apparatus.

As described above, according to the structure in which the keyboard 2 is partially stored in the accommodation portion 300 in the storage position 2A, because the volume of the accommodation portion 300 for storing the keyboard 2 is smaller than the volume of the keyboard 2, an increase in the size of the image forming apparatus may be minimized. Also, because the volume that the accommodation portion 300 occupies in the main body 1 of the image forming apparatus is small, a degree of freedom of arrangement of parts inside the image forming apparatus may be improved. Because the keyboard 2 partially protrudes from the outermost surface of the main body 1 in the withdrawal position 2B, the user may easily use the keyboard 2.

Referring to FIGS. 1 to 6, the image forming apparatus may further include a display 500. The display 500 may visually provide, for example, information related to an operation of the image forming apparatus, information related to setting a usage environment of the image forming apparatus, etc. The display 500 may be positioned above the keyboard 2 so that the user may identify the information input through the keyboard 2 through the display 500. For example, the display 500 may be installed in the protruding portion 200. The display 500 may be installed in the second part 220.

Figure 7:
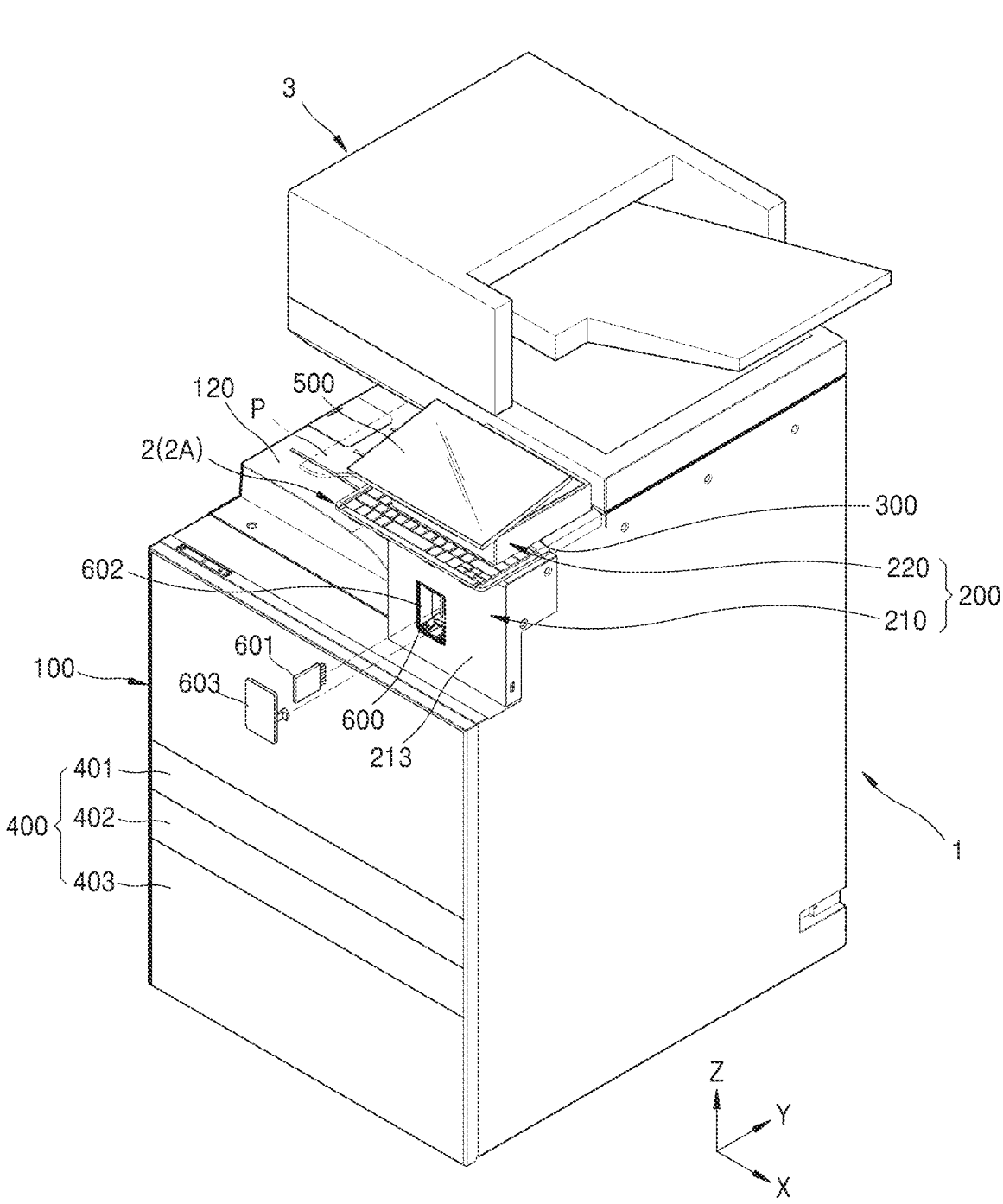
FIG. 7 is a schematic perspective view of an image forming apparatus according to an example.

FIG. 7 is a schematic perspective view of an image forming apparatus according to an example. Referring to FIG. 7, the image forming apparatus of the present example is different from the examples of the image forming apparatus described above in that the image forming apparatus of the present example includes an option mounting portion 600. Hereinafter, the differences will be mainly described. Referring to FIG. 7, an example of the image forming apparatus includes the option mounting portion 600 for mounting an option device 601. The option device 601 may include a device to provide an additional function to the image forming apparatus. For example, the option device 601 may include a Wi-Fi module to provide a wireless communication function, a card reader to recognize a storage medium in the form of a card, a facsimile option card to provide a facsimile transmission/reception function, etc. The option mounting portion 600 may be positioned below the keyboard 2. The option mounting portion 600 may be provided in the protruding portion 200, for example, the first part 210. In order for a user to easily access the option mounting portion 600 in front of the main body 1, an opening 602 may be provided in the front surface (FIG. 1:201) of the protruding portion 200, for example, the front surface 213 of the first part 210. A cover 603 is to cover the opening 602. The cover 603 may be separated from the front surface 213 of the first part 210, and the option device 601 may be mounted/removed to/from the option mounting portion 600 through the opening 602.

In the case of a structure in which a keyboard pivots to a storage position parallel to the front surface 201 of the protruding portion 200 and a withdrawal position extending in the depth direction Y, the keyboard covers the front surface 201 of the protruding portion 200 in the storage position. In this case, because the option mounting portion 600 needs to be arranged to be accessible from the side surface of the main body 1, user convenience may be reduced. According to the present example, because the keyboard 2 does not cover the front surface 201 of the protruding portion 200 in the storage position 2A, the opening 602 is arranged in the front surface 201 of the protruding portion 200 so that the user may access option mounting portion 600 in front of the main body 1.

Figure 8:
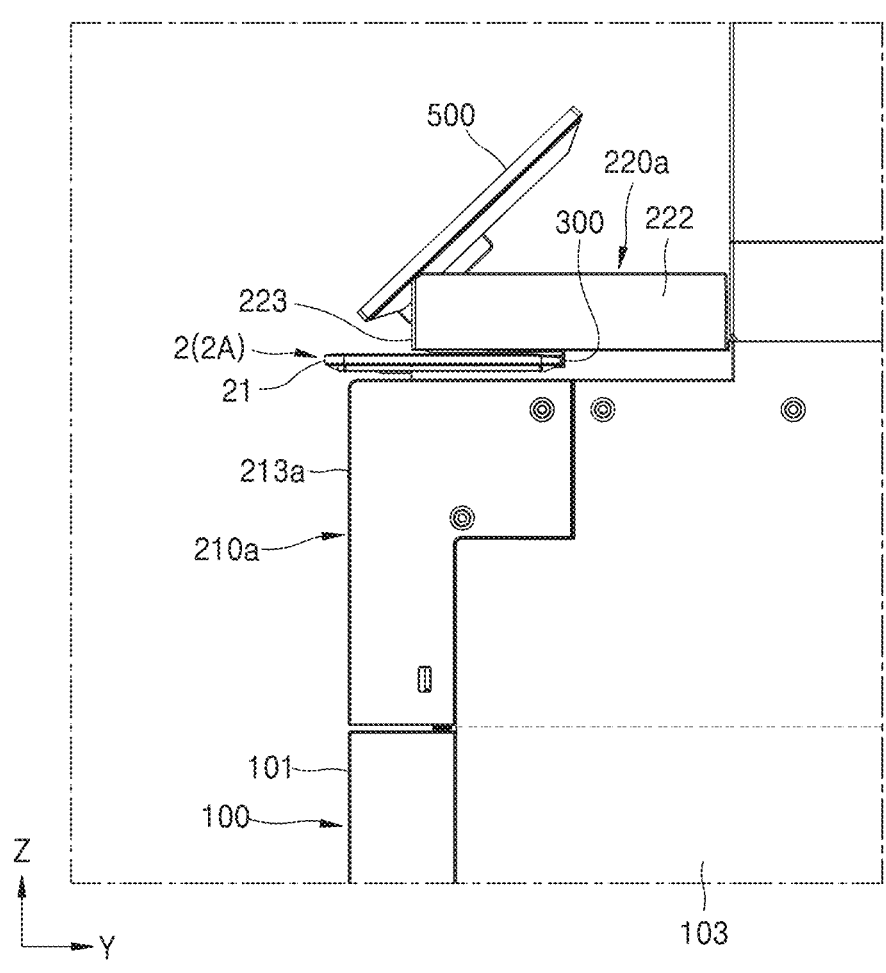
FIG. 8 is a schematic side view of an image forming apparatus according to an example.

FIG. 8 is a schematic side view of an image forming apparatus according to an example. The image forming apparatus of the present example is different from the examples of the image forming apparatus described above in that a front surface 213a of a first part 210a forming the protruding portion 200 is the same surface as the front surface 101 of the printing portion 100. Hereinafter, the differences will be mainly described. Referring to FIG. 8, the protruding portion 200 includes the first part 210a and a second part 220a. The front surface 213a of the first part 210a is the same surface as the front surface 101 of the printing portion 100. The front surface 223 of the second part 220a is positioned to be stepped inward from the front surface 213a of the first part 210a. In a case where the keyboard 2 is positioned in the storage position 2A, the front end 21 of the keyboard 2 may protrude to the outside of the accommodation portion 300. In this case, the front end 21 of the keyboard 2 may be positioned inside the front surface 213*a* of the first part 210*a*. In other words, at least the front end 21 of the keyboard 2 may be positioned between the front surface 213*a* of the first part 210*a* and the front surface 223 of the second part 220*a*.

Figure 9:
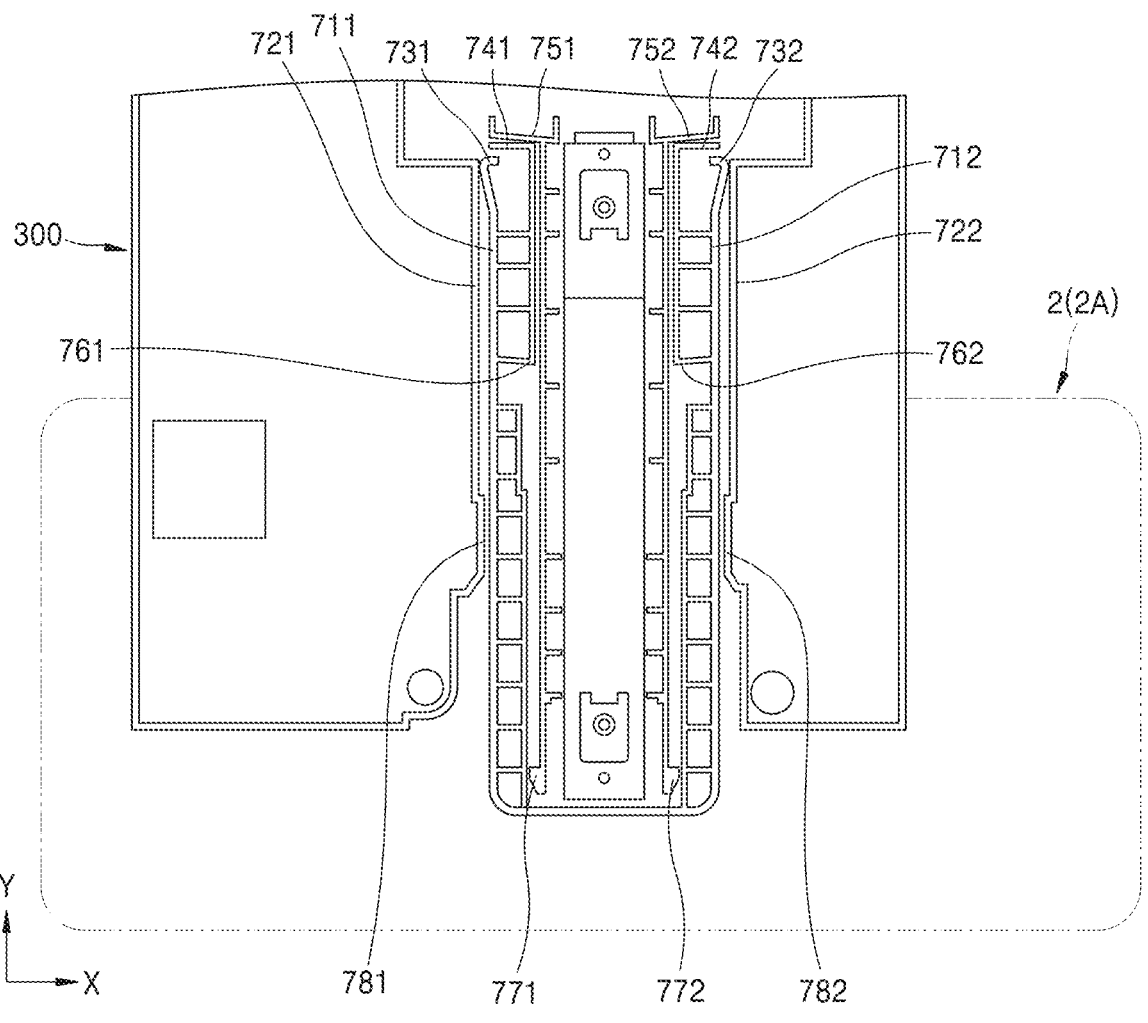
FIG. 9 is a plan view showing a sliding structure of a keyboard positioned in a storage position according to an example.
Figure 10:
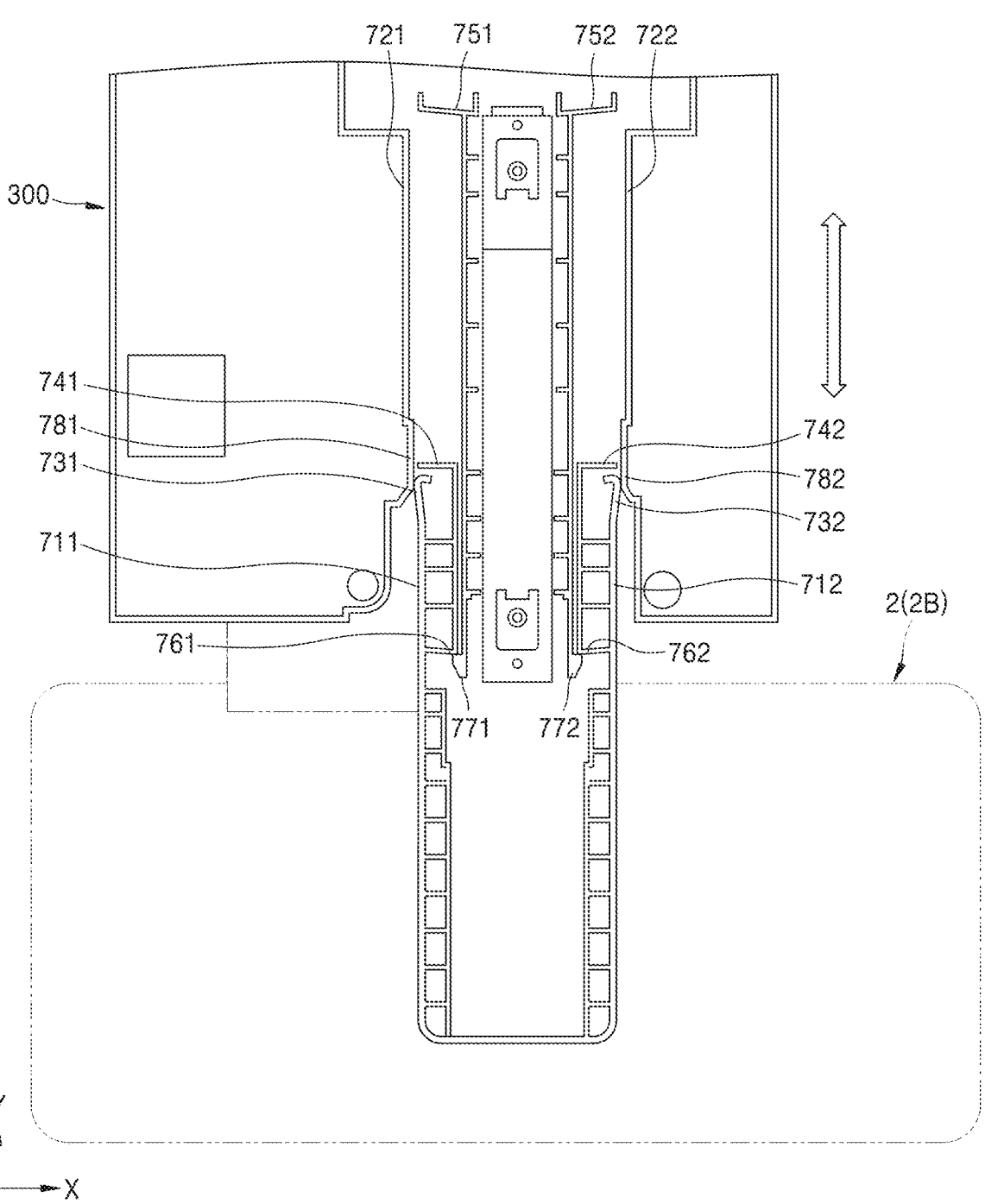
FIG. 10 is a plan view showing a sliding structure of a keyboard positioned in a withdrawal position according to an example.

A variety of sliding structures may be employed to slidably support the keyboard 2 in the storage position 2A and the withdraw position 2B. FIGS. 9 and 10 are plan views showing examples of a sliding structure of the keyboard 2, in which FIG. 9 shows the keyboard 2 positioned in the storage position 2A according to an example, and FIG. 10 shows the keyboard 2 positioned in the withdrawal position 2B according to an example.

Referring to FIGS. 9 and 10, the sliding structure may include first rails 711 and 712 and second rails 721 and 722. The first rails 711 and 712 may be provided on the keyboard 2. For example, the first rails 711 and 712 may be provided on a lower surface of the keyboard 2. The first rails 711 and 712 may be combined with the lower surface of the keyboard 2. The first rails 711 and 712 extend in the depth direction Y and may be positioned to be spaced apart from each other in the longitudinal direction X. The second rails 721 and 722 may be provided on the accommodation portion 300, for example, on an upper surface of the first part 210. The second rails 721 and 722 are to respectively guide the first rails 711 and 712 so that the keyboard 2 may slide between the storage position 2A and the withdrawal position 2B in the depth direction Y. The second rails 721 and 722 extend in the depth direction Y and are positioned to be spaced apart from each other in the longitudinal direction X. Elastic arms 731 and 732 may be respectively provided on the first rails 711 and 712 to elastically contact the second rails 721 and 722 and generate sliding resistance. The elastic arms 731 and 732 may be integrally formed with the first rails 711 and 712, respectively. The elastic arms 731 and 732 may be made of an elastic material, and respectively combined with the first rails 711 and 712.

First stoppers 751 and 752 may be provided in the accommodation portion 300 to block the keyboard 2 from sliding beyond the storage position 2A in a +Y direction. In a case where the keyboard 2 reaches the storage position 2A, for example, front ends 741 and 742 of the first rails 711 and 712 may respectively contact the first stoppers 751 and 752. Second stoppers 771 and 772 may be provided in the accommodation portion 300 to block the keyboard 2 from sliding beyond the withdrawal position 2B in a –Y direction. In a case where the keyboard 2 reaches the withdrawal position 2B, for example, locking portions 761 and 762 of the first rails 711 and 712 may respectively contact the second stoppers 771 and 772.

Sliding resistance increasing portions 781 and 782 may be provided in the accommodation portion 300 to increase the sliding resistance in a case where the keyboard 2 approaches the withdrawal position 2B. The sliding resistance increasing portions 781 and 782 may respectively increase amounts of elastic deformation of the elastic arms 731 and 732 in a case where the keyboard 2 approaches the withdrawal position 2B. For example, the sliding resistance increasing portions 781 and 782 may be formed to protrude from the second rails 721 and 722 toward the first rails 711 and 712. In a case where the keyboard 2 approaches the withdrawal position 2B, because the ends of the elastic arms 731 and 732 respectively come into contact with the sliding resistance increasing portions 781 and 782, the amounts of elastic deformation of the elastic arms 731 and 732 increase, which increases the sliding resistance of the keyboard 2. The user may sensibly recognize the increase in the sliding resistance and be made aware that the keyboard 2 approaches the withdrawal position 2B. Due to the increased amounts of elastic deformation of the elastic arms 731 and 732, the keyboard 2 may be stably maintained in the withdrawal position 2B. In a case where the keyboard 2 is used in the withdrawal position 2B, the shaking of the keyboard 2 is reduced, which makes it possible to stably use the keyboard 2.

Referring to FIG. 9, the keyboard 2 is positioned in the storage position 2A. The front ends 741 and 742 of the first rails 711 and 712 are respectively in contact with the first stoppers 751 and 752 provided in the accommodation portion 300. Accordingly, the keyboard 2 may no longer be moved in the +Y direction and may be maintained in the storage position 2A. Ends of the elastic arms 731 and 732 are in elastic contact with the second rails 721 and 722, respectively. Accordingly, the keyboard 2 may be stably maintained in the storage position 2A.

In the state shown in FIG. 9, the keyboard 2 may be slid to the withdrawal position 2B by using the front end (FIG. 4: 21) of the keyboard 2 exposed to the outside of the accommodation portion 300, for example, the handle (FIG. 4: 25), and pulling the front end forward, that is, in the –Y direction. The front ends 741 and 742 of the first rails 711 and 712 are respectively spaced apart from the first stoppers 751 and 752. The ends of the elastic arms 731 and 732 are respectively maintained in elastic contact with the second rails 721 and 722. Accordingly, resistance is generated in the sliding of the keyboard 2 in the –Y direction, and a stable sliding sensation may be transmitted through a user's hand. In addition, the risk of damage due to excessively fast sliding of the keyboard 2 may be reduced.

In a case where the keyboard 2 approaches the withdrawal position 2B, the ends of the elastic arms 731 and 732 come into contact with the sliding resistance increasing portions 781 and 782. The increase in the amounts of elastic deformation of the elastic arms 731 and 732 results in an increase in the sliding resistance. The user may sensibly recognize that the keyboard 2 is approaching the withdrawal position 2B and reduce the force pulling the keyboard 2 in the –Y direction. As shown in FIG. 10, in a case where the keyboard 2 reaches the withdrawal position 2B, the locking portions 761 and 762 respectively provided on the first rails 711 and 712 come into contact with the second stoppers 771 and 772, respectively, and the sliding of the keyboard 2 stops. In this state, the keyboard 2 may be used. The keyboard 2 may be stably maintained in the withdrawal position 2B due to the increased amounts of elastic deformation of the elastic arms 731 and 732, and thus the keyboard 2 may be stably used.

In a case where the keyboard 2 is not in use, in the state shown in FIG. 10, the keyboard 2 is slid in the +Y direction by pushing, for example, the front end 21 of the keyboard 2. As shown in FIG. 9, in a case where the keyboard 2 reaches the storage position 2A, the front ends 741 and 742 of the first rails 711 and 712 respectively come into contact with the first stoppers 751 and 752. The elastic arms 731 and 732 may be respectively maintained in elastic contact with the second rails 721 and 722, and the keyboard 2 may be maintained in the storage position 2A.

As described above, according to the image forming apparatus of the present example, the keyboard 2 is partially exposed to the outside of the main body 1 in the storage position 2A, and thus a position of the keyboard 2 may be intuitively recognized. Accordingly, the inconvenience that the user spends time to or does not find the position of the keyboard 2 may be improved. The space occupied by the accommodation portion 300 to store the keyboard 2 is small, and thus a degree of freedom of arrangement of parts inside the main body 1 of the image forming apparatus may be increased. The keyboard 2 may be positioned inside the outermost surface of the main body 1 in the storage position 2A, and thus the risk of damage to the keyboard 2 due to an external impact may be reduced. The option mounting portion 600, which is disposed below the keyboard 2, may be easily accessed. The sliding structure employing the elastic arms 731 and 732 for generating the sliding resistance may improve a user's sense of a sliding operation.

Examples described herein should be considered in a descriptive sense and not for purposes of limitation. Descriptions of features or aspects within each example should typically be considered as available for other similar features or aspects in other examples. While examples have been described with reference to the figures, it will be understood that various changes in form and details may be made therein without departing from the spirit and scope as defined by the following claims.

What is claimed is:

1. An image forming device comprising:
a printing portion to print an image on a print medium;
a protruding portion protruding upward from an upper surface of the printing portion and comprising an accommodation portion formed between a first part of the protruding portion and a second part of the protruding portion positioned on an upper portion of the first part; and
a keyboard movable between a storage position in which the keyboard is partially stored in the accommodation portion and a withdrawal position in which the keyboard is withdrawn from the accommodation portion,
wherein in the storage position, the keyboard is positioned partially outside the accommodation portion and inside an outermost surface of the printing portion.

2. The image forming device of claim 1, wherein:
a front surface of the protruding portion is stepped inward from a front surface of the printing portion,
the accommodation portion is recessed from a front surface of the protruding portion,
the keyboard is slidable in a first direction to be moved between the storage position and the withdrawal position, and
in the storage position, a part of a front end of the keyboard in the first direction or both ends of the keyboard in a second direction orthogonal to the first direction protrudes to an outside of the accommodation portion.

3. The image forming device of claim 1, wherein:
the first part of the protruding portion comprises:
a front surface that is a same surface as a front surface of the printing portion and protruding upward from the upper surface of the printing portion; and
the second part of the protruding portion comprises:
a front surface of the second part that is stepped away from the outermost surface of the printing portion with respect to a front surface of the first part.

4. The image forming device of claim 1, further comprising:
a display positioned above the keyboard and supported by the protruding portion; and
an option mounting portion positioned below the keyboard to mount an optional hardware device provided in the protruding portion, the option mounting portion comprising an opening in a front surface of the first part of the protruding portion.

5. The image forming device of claim 1, further comprising:

a discharge tray, on which a print medium discharged from the printing portion is to be loaded, provided in the upper surface of the printing portion,
wherein the protruding portion is positioned on one side of the discharge tray in a second direction orthogonal to a first direction which is a movement direction of the keyboard, and
wherein an inner end of the keyboard in the second direction in the storage position is positioned in an upper portion of the discharge tray.

6. The image forming device of claim 1, further comprising:
a first rail provided on the keyboard;
a second rail provided on the accommodation portion to guide the first rail so that the keyboard is able to be moved between the storage position and the withdrawal position; and
an elastic arm provided on the first rail to elastically contact the second rail and generate a sliding resistance.

7. The image forming device of claim 6, further comprising:
a sliding resistance increasing portion contacting the elastic arm so that the sliding resistance is increased in a case where the keyboard approaches the withdrawal position.

8. An image forming device comprising:
a printing portion to print an image on a print medium, the printing portion comprising an upper surface including a discharge tray on which the print medium that has undergone printing is to be loaded;
a protruding portion protruding upward from the upper surface of the printing portion and located on one side of the discharge tray, the protruding portion comprising a first part with a front surface stepped inward along a first direction from a front surface of the printing portion and a second part, wherein an accommodation portion recessed from the front surface of the first part of the protruding portion is formed between the first part and the second part; and
a keyboard movable between a storage position inserted into the accommodation portion in the first direction and a withdrawal position withdrawn from the accommodation portion,
wherein the accommodation portion has a first depth in the first direction and a first length in a second direction orthogonal to the first direction,
wherein the keyboard has a second depth in the first direction and a second length in the second direction,
wherein the second length or the second depth is respectively greater than the first length or the first depth, and
wherein, in the storage position, the keyboard is positioned inside an outermost surface of the printing portion.

9. The image forming device of claim 8, wherein the first part of the protruding portion is
protruding upward from the upper surface of the printing portion and having a third length in the second direction longer than the first length; and
the second part is positioned on an upper portion of the first part, the second part having the first length in the second direction.

10. The image forming device of claim 9, wherein
the first part has a first inner surface adjacent to the front surface of the first part and extending in the first direction and a first outer surface opposing the first inner surface and extending in the first direction, the second part has a second inner surface adjacent to the front surface of the second part and extending in the first direction and a second outer surface opposing the first inner surface and extending in the first direction, and the second outer surface is stepped inward along the second direction from the first outer surface.

11. The image forming device of claim 10, wherein an outer end of the keyboard, corresponding to the portion of the keyboard closest to the first and second outer surfaces, is positioned between the first outer surface and the second outer surface with respect to the second direction, and in the storage position, a front end of the keyboard, corresponding to the portion of the keyboard furthest in the direction that the front surface of the first portion is facing, in the first direction is positioned further inside than the front surface of the printing portion with respect to the first direction.

12. The image forming device of claim 10, wherein a discharge port, through which a print medium that has undergone printing is to be discharged, is provided in the first inner surface, and an inner end of the keyboard with respect to the second direction in the storage position is positioned on an upper portion of the discharge tray.

13. The image forming device of claim 10, further comprising:

a display installed in the second part; and an option mounting portion comprising an opening formed in the front surface of the first part of the protruding portion to mount an optional hardware device installed in the first part.

14. An image forming device comprising:

a main body including a recess in a front surface of the main body forming an accommodation portion; and a keyboard movable between a storage position in which the keyboard is partially stored in the accommodation portion and a withdrawal position in which the keyboard is withdrawn from the accommodation portion, wherein, in the storage position, a front end of the keyboard with respect to the front surface of the main body and an outer end of the keyboard adjacent to the front end of the keyboard are positioned outside the accommodation portion and inside front and side surfaces of the main body of the image forming device.

15. The image forming device of claim 14, wherein the main body comprises:

a printing portion to print an image on a print medium, the printing portion comprising an upper surface including a discharge tray on which the print medium that has undergone printing is to be loaded; and a protruding portion, protruding upward from the upper surface of the printing portion, on one side of the discharge tray, the protruding portion comprising a front surface in the same orientation as the front surface of the image forming device stepped inward from a front surface of the printing portion in the same orientation as the front surface of the image forming device, wherein the accommodation portion is recessed from the front surface of the protruding portion.

* * * * *